United States Patent
Cazanas et al.

(10) Patent No.: US 8,917,590 B2
(45) Date of Patent: Dec. 23, 2014

(54) METHOD AND SYSTEM FOR TRANSFERRING CONTROL OF A CONFERENCE BRIDGE

(75) Inventors: Carlos A. Cazanas, Bethlehem, PA (US); Azam Khan, Franklin, NJ (US); Terence John Sullivan, Pequannock, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 230 days.

(21) Appl. No.: 13/336,691

(22) Filed: Dec. 23, 2011

(65) Prior Publication Data

US 2013/0163739 A1 Jun. 27, 2013

(51) Int. Cl.
*H04L 12/16* (2006.01)
*H04M 7/00* (2006.01)
*H04M 3/56* (2006.01)

(52) U.S. Cl.
CPC ............... *H04M 3/56* (2013.01); *H04M 7/006* (2013.01)
USPC ...................................... 370/216; 379/202.01

(58) Field of Classification Search
CPC ..................... H04L 12/1813; H04L 29/06414; H04M 3/567; H04M 3/561
USPC ................ 370/260, 261; 379/202.01, 265.01; 709/204, 206
See application file for complete search history.

(56) References Cited

U.S. PATENT DOCUMENTS

| | | | |
|---|---|---|---|
| 2006/0209728 A1* | 9/2006 | van der Gaast | 370/260 |
| 2008/0013533 A1 | 1/2008 | Bogineni et al. | |
| 2009/0168985 A1* | 7/2009 | Yu et al. | 379/202.01 |
| 2009/0220066 A1* | 9/2009 | Shaffer et al. | 379/204.01 |
| 2011/0014902 A1* | 1/2011 | Niemi | 455/416 |
| 2011/0110275 A1* | 5/2011 | Shaheen | 370/260 |
| 2011/0134807 A1* | 6/2011 | Tevonian | 370/260 |
| 2011/0150199 A1* | 6/2011 | Gisby et al. | 379/202.01 |
| 2012/0163576 A1* | 6/2012 | Bentley et al. | 379/202.01 |
| 2012/0296964 A1* | 11/2012 | Chaturvedi et al. | 709/204 |

* cited by examiner

*Primary Examiner* — Andrew Lai
*Assistant Examiner* — Jamaal Henson

(57) ABSTRACT

A conference calling system enables transfer of control of a conference bridge. The transferor terminal has an option to transfer control of the conference bridge to a transferee terminal. The transferee terminal has an option to accept or reject control of the conference bridge. When the transferee terminal accepts control prior to the transferor terminal severing control, the control of the conference bridge is transferred to the transferee terminal. However, when the transferee terminal rejects or does not accept within a predetermined time the control of the conference bridge, the transferor terminal is provided an option to transfer control of the conference bridge to alternate terminals, one terminal at a time, until an alternate terminal accepts control or the transferor terminal severs control of the conference bridge. As long as a terminal has control of the conference bridge, the conference bridge is not severed.

24 Claims, 5 Drawing Sheets

METHOD AND SYSTEM FOR TRANSFERRING CONTROL OF A CONFERENCE BRIDGE

BACKGROUND

In a conference call, several parties are called or call-in on their landlines or mobile phones to listen and even participate in the telephone call. Conference calls may be configured so that the calling party calls other participants and adds them to the call. Alternative, participants may be able to call into the conference call themselves, by dialing into a special telephone number that connects them to a conference bridge. The conference bridge links the different telephone lines. A service provider may maintain the conference bridge and provide the phone numbers and PIN codes that participants can dial to access the telephone conference.

A conference call is typically controlled by the host device/user. The host may be a user who schedules the conference call and controls the features of the call, including when the call begins and when it ends. The conference call cannot begin without the host terminal and ends as soon as the host terminal is no longer part of the conference. Such a rigid configuration introduces several problems.

For example, the host may be running out of charge on his/her terminal (e.g., mobile communication device) and may want to continue the call on another terminal (e.g., mobile or landline communication device). Alternatively, the host may no longer need to be part of the conference and may want to transfer control of the bridge to another participant. In existing conference systems, the bridge is immediately severed when the host terminal is no longer available. There is no capability for the host to transfer his or her control of the bridge to another communication device or to another participant. Accordingly, the other participants are prevented from continuing the conference. If the host is no longer available, the participants would have to re-establish a conference, thereby wasting valuable time and possibly disturbing the momentum of the original conference.

Accordingly, there is a need for a method and system to move the control of a bridge to another communication device or another participant of a conference.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
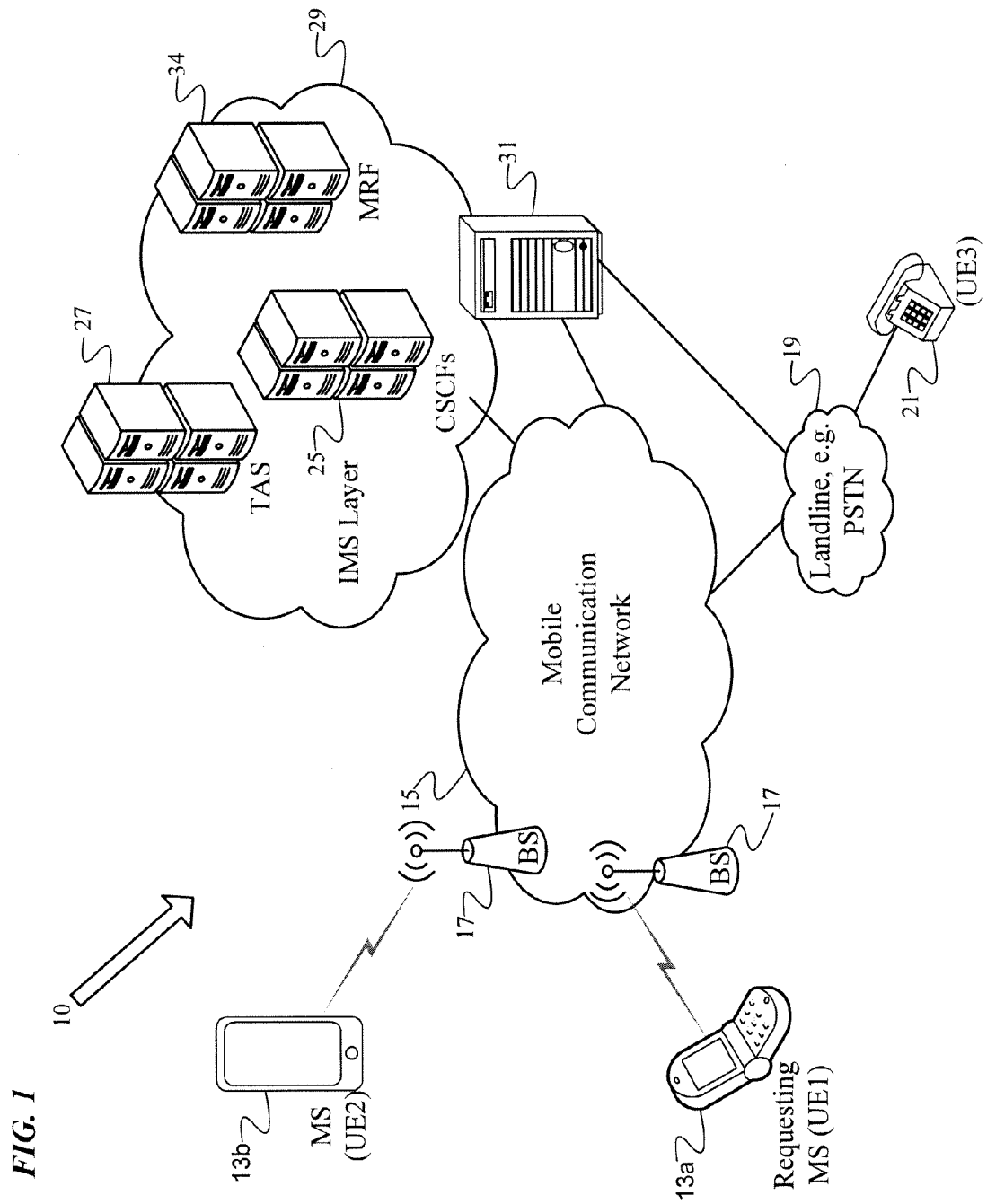
FIG. 1 is a high-level functional block diagram of an example of a system including a wireless mobile communication network and other networks and elements, which together may implement a system for creating, maintaining, and transferring control of a conference call.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various exemplary systems and methods discussed in this section relate to hosting a conference call at a server of a value added service provider or the like which can be controlled by IP Multimedia Subsystem or IP Multimedia Core Network Subsystem (IMS) enabled phones. IMS is an architectural framework for delivering Internet Protocol (IP) multimedia services. IMS uses the Session Initiation Protocol (SIP) to provide integration with the internet. It provides access of multimedia and voice applications from wireless and wireline terminals. A user can connect to IMS in different ways, including the standard Internet Protocol (IP). IMS terminals (e.g., mobile phones, computers, and personal digital assistants (PDAs)) can register directly on IMS, even when they are roaming in a different network, as long as IP and SIP are accessible. Mobile access (e.g., CDMA, GSM, GPRS), wireless access (e.g., WLAN, WiMAX), and fixed access (e.g., cable modems, Ethernet, DSL) are all supported. Other phone systems, like plain old telephone service (POTS) and non IMS compatible VoIP systems, are supported through gateways.

The equipment and methods discussed by way of examples in the description of the drawings relate to configuration of a system that provides the ability to transfer control of a conference bridge from a transferor terminal to a transferee terminal. For example, a Media Resource Function Controller (MRF) assigns control of the conference bridge to a first terminal. The first (transferor) terminal has an option to transfer control of the conference bridge to a second (transferee) terminal. Now, the transferee terminal has an option to accept or reject control of the conference bridge, or simply do nothing.

When the transferee terminal accepts control prior to the transferor terminal severing control, the control of the conference bridge is transferred to the transferee terminal. However, when the second terminal rejects or does not accept within a predetermined time the control of the conference bridge, the transferor terminal is provided an option to transfer control of the conference bridge to alternate terminals. For example, the predetermined time may be 20 seconds after notification of the transferee terminal. In this regard, the transferor terminal has the option to select an alternate terminal, one terminal at a time, until an alternate terminal accepts control or the transferor terminal severs control of the conference bridge. As long as a terminal has control of the conference bridge, the conference bridge is not severed. Put differently, the conference call ends as soon as the conference bridge is severed because no terminal has control over the conference bridge.

Transfer of the control of the conference bridge may be initiated at any time by the user of the transferor terminal.

Alternatively, transfer of the control of the conference bridge may be performed automatically by the system. In one example, there is an alert at the transferor terminal in response to a trigger signal. The trigger may be a predetermined low power level. For example, the trigger may relate to the power level of the transferor terminal falling to or below a threshold. Other triggers may be a scheduling conflict or an intervening event. As to an intervening event, for example, the terminal may sense that the transferor terminal is losing signal (i.e., entering an elevator) or there is another call coming in to the transferor terminal. The control of the conference bridge can be transferred to a terminal that already is a current conference participant or to a terminal that is not a current conference participant.

In one example, there is a preconfigured hierarchy of alternate terminals that are offered (or automatically transferred) control of the conference bridge. If a first of the alternate terminals rejects or does not accept within a predetermined time the control of the conference bridge, another terminal, one lower in hierarchy, is offered control of the conference bridge. This continues until a terminal in the hierarchy accepts control of the conference bridge or no terminal has control of the conference bridge. In one example, the hierarchy is based on the order of the invitation to the conference.

In one example, transfer of the control of the conference bridge is implemented using an SIP REFER infrastructure. In another example, transfer of the control of the conference bridge uses an SIP INVITE infrastructure.

FIG. 1 illustrates a system 10 supporting a variety of mobile communication services for users of any number of mobile and stationary devices, including the conferencing functionalities of interest here. The drawing shows two mobile stations (MS) 13a and 13b, by way of example, as well as a mobile communication network 15. The network 15 provides mobile wireless communications services to that station as well as to other mobile stations (not shown), for example, via a number of base stations (BSs) 17. The present techniques may be implemented in any of a variety of available mobile networks 15 and/or on or for any type of IMS terminal compatible with such a network 15, and the drawing shows only a very simplified example of a few relevant elements of the network 15 for purposes of discussion here.

The network 15 allows users of the mobile stations such as 13a or 13b to initiate and receive telephone calls to each other. The network 15 also allows users of the mobile stations as well as through one or more other networks 19 offering voice telephone type services, such as the public switched telephone network (PSTN) or another mobile network, with telephone stations or other voice communication equipment served by or through such other network(s) 19. The telephone station symbol 21 is generally intended to represent various forms of telephones served via the other telephone network 19 as well as other types of voice equipment such as equipment of a call-in conference service, for purposes of later discussion.

The conference control service may be offered by a Telephony Application Server (TAS) 27 in coordination with a MRF 34. In general, a TAS 27 is an entity that provides digit analysis and/or dialed number translations as well as other services to clients, generally network providers as well as end users, without actually performing the role of the network carrier or provider. A carrier/network operator may also represent one or more entities that utilize a TAS 27, for example, in order to provide improved content to their subscribers over their network rather than investing the capital to offer such services directly. The TAS typically operates a server which communicates through an IP network such as the Internet, and through a gateway and the network 15 with subscribers' mobile stations. The example of a system 10 for offering transfer of the control of the conference bridge utilizes a TAS 27 in coordination with a MRF 34 to provide the service, and the TAS equipment is generally represented by the one server 27 in the drawing. Also, although shown as communicating via the public Internet, the TAS 27 could utilize a private intranet for communications with the mobile network 15. The MRF 34, Media Resource Function (MRF) provides media related functions such as media manipulation (e.g. voice stream mixing) and playing of tones and announcements.

Although a variety of other numbers or identifiers may be assigned to a mobile station for various network purposes, a Mobile Directory Number (MDN) or Mobile Telephone Number (MTN) is the telephone number assigned to a mobile station that a calling party or device inputs in order to call or send a message to the particular mobile station. To call the mobile station 13, for example, a user of a PSTN 19 telephone or of another mobile station (e.g. 13b) dials the MDN associated with the mobile station 13a.

The actual conference call may be set-up in a variety of ways. Today many user devices and networks support voice over data communication, typically as voice over internet protocol (VoIP) communications, via a data session through the network(s) serving the requested party. A call using VoIP bearer transport for the exchange of audible communications is set-up via an exchange of signaling messages in accord with a standardized signaling protocol, such as the session initiation protocol (SIP). For example, the devices may be similar mobile stations served by network 15, the telephone 21 may be a station that obtains data services through another mobile network at 19, or the telephone 21 may be served through an IP network. In such a situation, the server would send SIP messages (e.g., initiate, terminate, and terminate sessions) and exchange other SIP signaling messages with the station 13 and the telephone to facilitate communication over IP packets between the two devices. Once the VoIP call is set-up, the server would not longer be involved; packets would flow back and forth between the mobile station 13 and the telephone 21 without going through the TAS call scheduling server 27.

However, there may be situations where the devices or their serving networks do not support VoIP communications. For VoIP calls to/from telephone equipment on the legacy PSTN network or to other devices that do not have VoIP capability, service providers have deployed gateway Session Border Controllers (SBCs) that provide voice network interfaces to and from the Internet 23. For illustration and discussion purposes, the drawing shows one such voice gateway at 31.

Assume by way of another example, that the telephone 21 is a legacy type telephone served by the PSTN as the other network 19. The TAS server 27 would do the SIP signaling exchange with the mobile station 13 as in the earlier example, but the SIP signaling for the link to the other party would go through the SBC 31. The SBC 31 would make a regular telephone call to the telephone 21 through the PSTN 19, and VoIP packets for the call would be exchanged between the mobile station 13 and the SBC 31. The gateway 31 would provide the two-way conversions between the protocols for communication via the PSTN and those used for VoIP communication via the Internet 23. If the mobile station 13 does not have VoIP capabilities, then a gateway like 31 could be used to set-up the leg of the call for the mobile station 13, in a similar fashion.

The basic services for the IP IMS, as defined in 3GPP TS, allow a host to initiate, modify, and terminate media sessions based on the SIP. Although these mechanisms provide multi-party calls, more sophisticated services for communication between multiple parties are made available by the network 19. For SIP based conferences, the conferencing Telephony Application Server (TAS) 27 in coordination with the MRF 34 provides the role of a conference focus setup and as a conference notification service. The MRF 34 further controls the role of each conference participant. In this regard, the host device (terminal) and its associated user control the features of the call, including when the call begins and when it ends. The conference call cannot begin without a host terminal and ends as soon as a host terminal is no longer part of the conference. When a first user initiates a conference by inviting other participants to a conference, the MRF 34 attributes the role of host (via his IMS terminal) to the first user. Thus, the host is the "owner" of the conference bridge. The host has the option of ending the conference at any point by simply ending the call, thereby severing the conference bridge. Alternatively, the host may transfer control of the bridge to another IMS terminal.

By way of example, consider the situation where the host is running out of charge on his IMS terminal (e.g., mobile phone) and may want to continue the call on another IMS enabled device. Put differently, the control of the conference bridge is to be transferred to another terminal associated with the same user. Alternatively, the host may no longer need to be part of the conference and may want to transfer control of the bridge to another participant. In one example, the host can interact with their IMS terminal to select an option to transfer control of the bridge to another IMS terminal. The host provides a target IMS MDN number/ID to transfer control of the conference bridge. The other IMS terminal may be one that is currently not in use. In this regard, the host can accept control of the bridge on the alternate IMS terminal, allowing the conference to continue unabated. The transfer of control of the conference bridge from one IMS terminal to the other occurs when control of the bridge is accepted on the second terminal (transferee terminal).

In another example, control of the bridge is transferred to an IMS terminal that is already in use (i.e., by an existing conference participant). In this regard, the existing conference participant has the options of accepting, not accepting control of the conference bridge, or simply doing nothing. As in the example above, transfer of control of the bridge is complete when the existing conference participant accepts control.

In one example, transfer of the control of the bridge is suggested by the IMS terminal in response to a trigger event. The trigger event may be a power meter indicating that a predetermined low power level has been reached on the IMS terminal. Another trigger event may be a scheduled event. The suggestion to transfer control of the bridge may be through a message on the screen of the IMS terminal, an audible tone, a haptic signal, or any combination thereof.

As to the transferee IMS terminal, a request for acceptance of the control of the bridge may be through similar interaction with the IMS terminal. The transferee IMS terminal can accept control of the bridge by, for example, voice, confirmation on the terminal, or any combination thereof.

There are different ways for a user of an IMS terminal, or user equipment (UE), to communicate to a TAS and Multimedia Resource Function (MRF), the intent to transfer control of a conference bridge (conference focus) to another IMS terminal. In this regard, INVITE/UPDATE/REFER message infrastructures could be used. REFER is a SIP method which indicates that the recipient (identified by the Request-URI) should contact a third party using the contact information provided in a request. REFER can be used to establish the initial conference between several UEs. It has the capability to contain a "message body." A receiving agent has the capability of processing the "message body" according to its content-type. For example, the header of the "message body" can include "move isfocus to MDN" (or transfer control of the bridge to another UE). The TAS is preprogrammed to interpret this message and to direct the MTF 34 to assign the conference focus to the UE indicated in the "To" field of the header of the REFER message.

Figure 2:
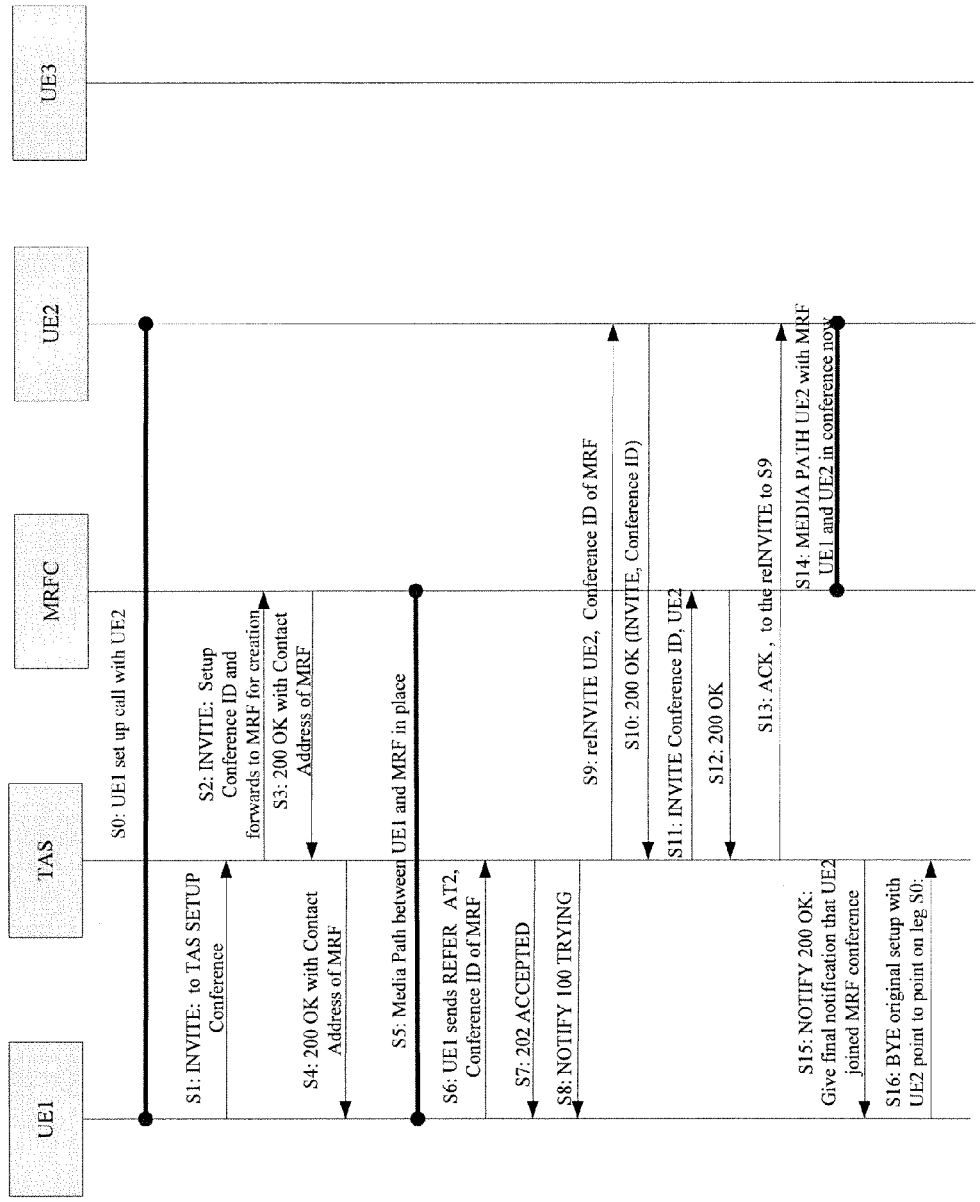
FIG. 2 is an exemplary call flow where control of the conference bridge is not transferred.

It may be helpful now to consider some examples of the steps involved in scheduling and maintaining a conference call. FIG. 2 is an exemplary flow chart illustrating a conference setup without the present enhancements of transferring control of the bridge. For purposes of this example, we will assume that the user of an IMS terminal (i.e., 13a in FIG. 1 and user equipment 1 (UE1) in FIG. 2), would like to establish a conference with the user of another IMS terminal (i.e., user equipment 2 (UE2)). Although UE1 and UE2 are discussed for simplicity, one skilled in the art will readily realize that additional user equipment (e.g., UE3, UE4, etc.) can be involved in the conference using the same approach.

In the example of FIG. 2, the initial step S0 involves the user operating UE1 setting up a call with UE2. In step S1, UE1 sends an INVITE message to the TAS to setup the conference. In step S2, the TAS sets up the conference ID and forwards it to the Multimedia Resource Function (MRF). The "isfocus" feature parameter is indicated in the contact header. Conference participant UE1 will later store the content of the received contact header as the conference Uniform Resource Identifier (URI).

In step S3, the MRF provides a "200 OK" signal with the contact address of the MRF. In step S4, the TAS receives the "200 OK" with the contact address from the MRF and forwards it to UE1. Step S5, indicates that there is now a media path between UE1 and the MRF.

In step S6, UE1 sends a REFER request to the TAS which includes the conference ID of the MRF. In step S7, the TAS sends a "202" message to the UE1, indicating that the REFER request has been accepted. In step S8, the TAS sends a "100" message to UE1. This is a provisional response, indicating that the TAS is trying to process the REFER request.

In step S9 a reINVITE message is sent to UE2 with the conference ID of the MRF. In step S10, UE2 acknowledges the INVITE request with a "200" (OK) response to the TAS. In step S11, the TAS sends the INVITE message, including the conference ID of the UE2 to the MRF. Similarly, in step S12, the MRF acknowledges the INVITE request with a "200" (OK) response to the TAS.

Next, in step S13, the TAS sends an acknowledgment (ACK) message to the UE2, indicating that the reINVITE of step S9 has been processed. Step S14 indicates that there is a media path between UE2 and the MRF. Accordingly, UE1 and UE2 are now in a conference session.

In step S15, the TAS sends a notification message "200" to the UE1, indicating that UE2 has joined the MRF in the conference. The host (i.e., UE1) can end the conference at any point. For example, in step S16, UE1 sends a "BYE" message to the TAS, thereby releasing the active conference session between UE1 and UE2. If another conference participant (i.e., UE2) would have left the conference first, a NOTIFY request would have been sent with updated conference state information to all conference participants (UE1 in this case).

Figure 3A:
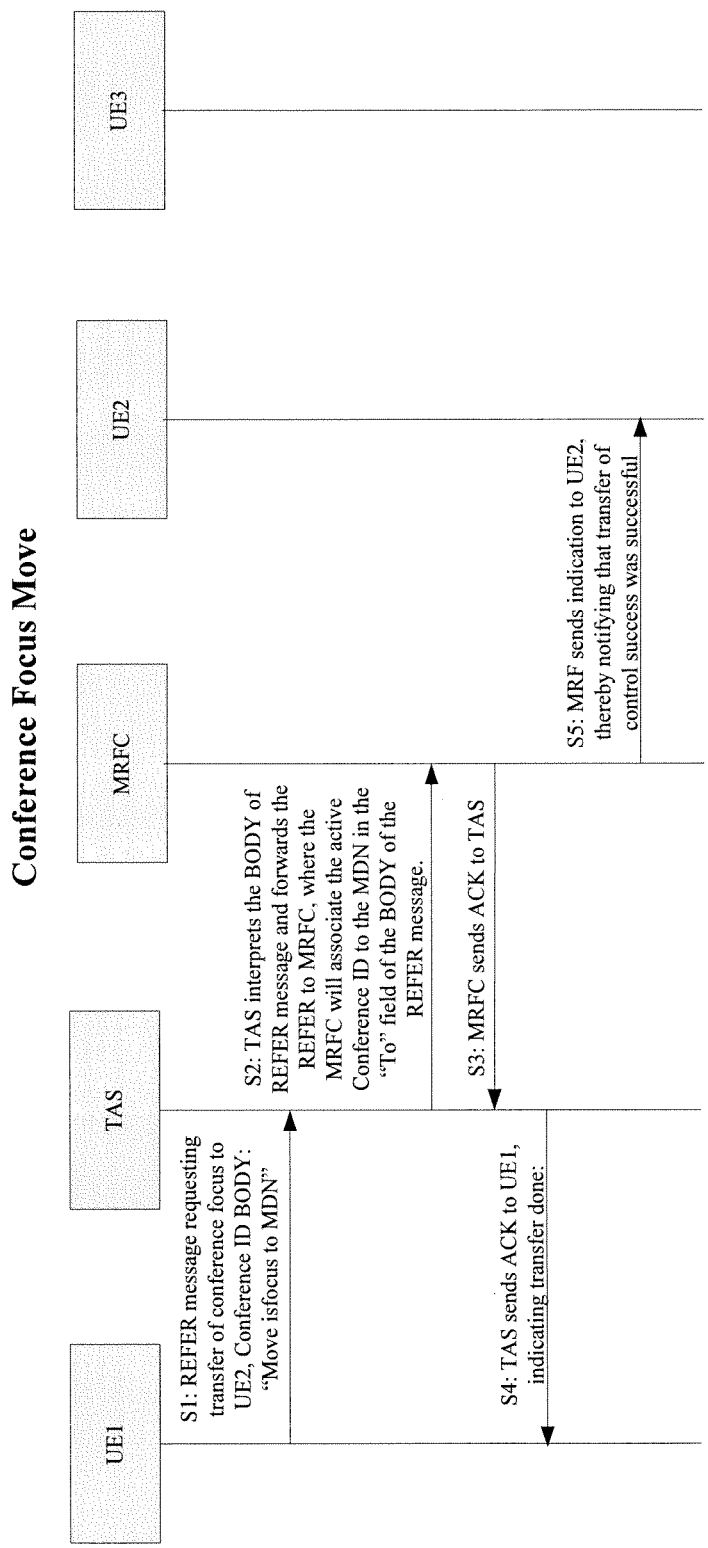
FIG. 3A is an exemplary call flow where control of the conference bridge is transferred to another IMS terminal using a SIP REFER method.
Figure 3B:
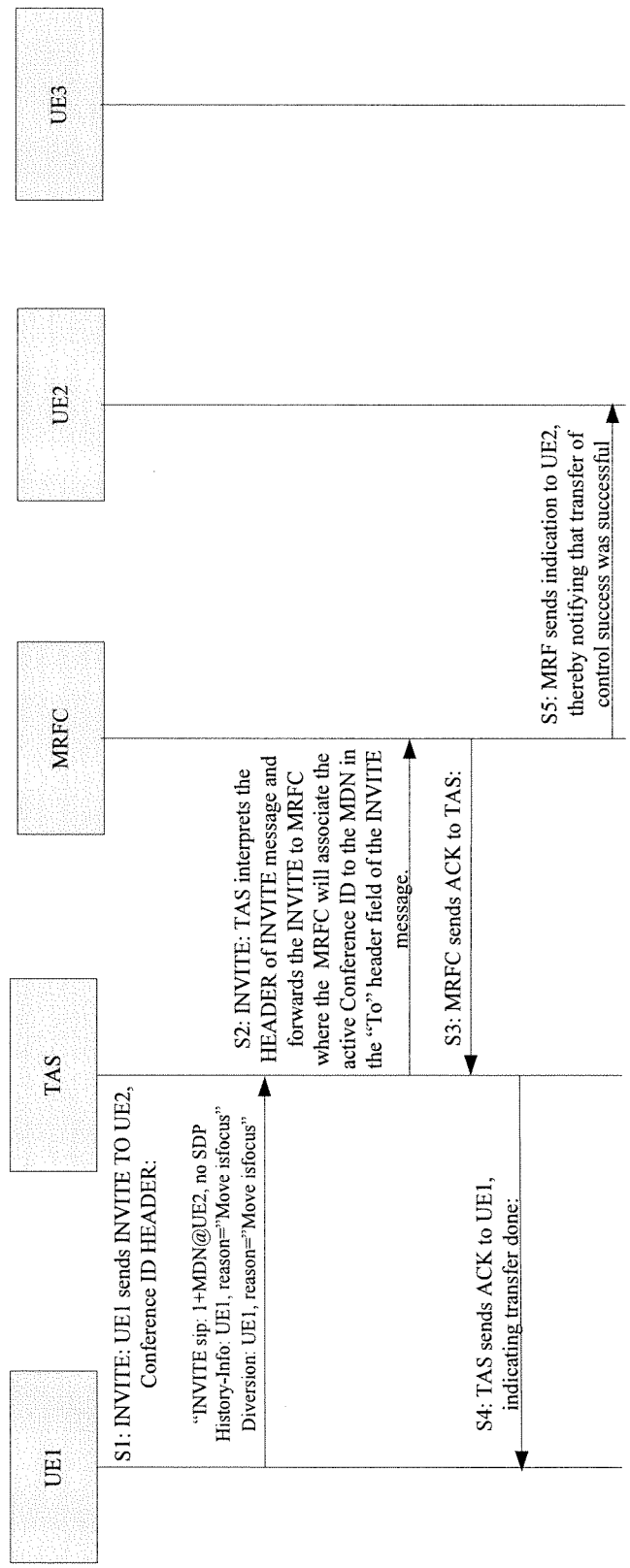
FIG. 3B is an exemplary call flow where control of the conference bridge is transferred to another IMS terminal using a SIP INVITE method.

Consider now a scenario where the user behind UE1 does not want to terminate the conference; instead, the user behind UE1 wants to transfer control to another user equipment (e.g., UE2, UE3, etc). In this regard, FIG. 3A illustrates an exemplary conference call flow where the transferor terminal (i.e., UE1) transfers control of the conference bridge to a transferee terminal (UE2) using the REFER message infrastructure. In step S1, UE1 sends a REFER message to the TAS, thereby requesting the TAS to transfer control of the conference bridge (conference focus) to UE2. For example, the message may include "Move isfocus to MDN."

In step S2, the TAS interprets REFER message and forwards the message to the MRF. This step, indicates that UE2 is to have control over the conference bridge.

In step S3, the MRF sends an ACK message back to the TAS. In particular, the MRF interprets the REFER (i.e., "move isfocus to MDN") message from the TAS and acknowledges that UE2 is to have control of the conference bridge. Accordingly, once the control of the conference bridge is transferred to UE2, UE2 will be able to add or remove participants in the ongoing conference.

In step S4, the TAS sends an ACK message back to UE1 indicating that transfer of the control of the conference bridge has been successful. Even if UE1 is no longer participating in the conference, the transfer of control of the bridge is complete.

In step S5, the MRF sends a notification to UE2 that transfer of the control of the conference bridge was successful. In one embodiment, step S5 may occur before step S4, while in another embodiment steps S4 and S5 may be performed simultaneously.

As noted above, transfer of the control of the conference bridge can be implemented using the SIP INVITE message infrastructure as well. Using the INVITE method has certain benefits over the REFER method. For example, there is less application development on the TAS side. The same header information from the INVITE message infrastructure can be used, where only the destination indicator to the transferee UE is modified.

For example, in step S1, UE1 sends an INVITE message to the TAS, thereby requesting the TAS to transfer control of the conference bridge (conference focus) to UE2. In this example, the header message includes the following:

INVITE sip:1+MDN@fqdn, no SDP
P-Asserted-Identity=UE2
History-Info: UE1, reason="move-isfocus"
Diversion: UE1, reason="move-isfocus"

In step S2, the TAS interprets the header, including the "History-Info" and "Diversion," of the INVITE message and forwards the INVITE message to the MRF. This step, indicates that UE2 is to have control over the conference bridge.

In step S3, the MRF sends an ACK message back to the TAS. In particular, the MRF interprets the INVITE message from the TAS and acknowledges that UE2 is to have control of the conference bridge. Accordingly, once the control of the conference bridge is transferred to UE2, UE2 will be able to add or remove participants in the ongoing conference.

In step S4, the TAS sends an ACK message back to UE1 indicating that transfer of the control of the conference bridge is successful. Even if UE1 is no longer participating in the conference, the transfer of control of the bridge is complete and the conference continues unabated.

In step S5, the MRF sends a notification to UE2 that transfer of the control of the conference bridge is successful. In one embodiment, step S5 may occur before step S4, while in another embodiment steps S4 and S5 may be performed simultaneously.

As shown by the discussion of the method of FIG. 1, the conference call may involve an interaction with an appropriately configured mobile station 13. Those skilled in the art presumably are familiar with the structure, programming and operations of such stations. However, for completeness, it may be useful to consider the functional elements/aspects of an exemplary mobile station, at a high-level.

Figure 4:
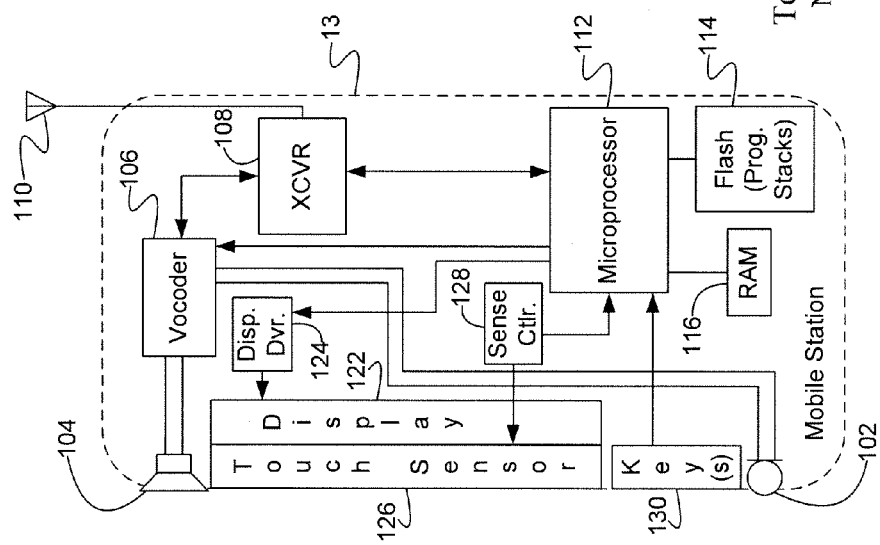
FIG. 4 is a high-level functional block diagram of an example of a mobile station.

For purposes of such a discussion, FIG. 4 provides a block diagram illustration of an exemplary wireless device 13. Although the wireless device 13 may be a smart-phone or may be incorporated into another device, such as a personal digital assistant (PDA) or the like, for discussion purposes, the illustration shows the wireless device 13 in the form of a handset. The handset embodiment of the wireless device 13 functions as a normal digital wireless telephone station. For that function, the station 13 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications through network 15 and possibly voice over packet (Internet Protocol) communications if supported by the station 13 and the data services through the network 15.

For digital wireless communications, the handset 13 also includes at least one digital transceiver (XCVR) 108. The transceiver (XCVR) 108 could be a multimode transceiver, or the mobile station 13 may include two or more transceivers each of which supports a subset of the various technologies or modes. The concepts discussed here encompass embodiments of the mobile station 13 utilizing any digital transceivers that conform to current or future developed digital wireless communication standards.

The transceiver 108 provides two-way wireless communication of information, such as vocoded speech samples and/or digital message information, in accordance with the technology of the network 10. The transceiver 108 also sends and receives a variety of signaling messages in support of the various voice and data services provided via the station 13 and the communication network, in this case. Each transceiver 108 connects through RF send and receive amplifiers (not separately shown) to an antenna 110. In the example, the transceiver 108 is configured for RF communication in accord with a digital wireless protocol, such as the current CDMA and 3GPP protocols.

The station 13b includes a display 122 for displaying messages, menus or the like, call related information dialed by the user, calling party numbers, etc. The wireless mobile communication device 101B also includes a touch/position sensor 126. The sensor 126 is relatively transparent, so that the user may view the information presented on the display 122. A sense controller 128 sensing signals from elements of the touch/position sensor 126 and detects occurrence and position of each touch of the screen formed by the display 122 and sensor 126. The sense circuit 128 provides touch position information to the microprocessor 112, which correlates that information to the information currently displayed via the display 122, to determine the nature of user input via the screen.

The display 122 and touch sensor 126 (and possibly one or more keys 130, if included) are the physical elements providing the textual and graphical user interface for the Mobile Station 13b. The microphone 102 and speaker 104 may be used as additional user interface elements, for audio input and output. Of course, other user interface elements may be used, such as a trackball, as in some types of PDAs or smart phones.

Station 13b may also include a haptic element (not shown) to provide haptic feedback to the user. Various combinations of the keypad 120, display 122, microphone 102, haptic element, and speaker 104 may be used as the physical input output elements of the graphical user interface (GUI), for multimedia (e.g., audio and/or video) communications. Of course other user interface elements may be used, such as a stylus and touch sensitive display screen, as in a PDA or smart phone. In addition to normal telephone and data communication related input/output (including message input and message display functions), the user interface elements also may be used for display of menus and other information to the user and user input of selections, for example, including any needed to request or accept transfer of the control of a conference bridge.

In the example, a microprocessor 112 serves as a programmable controller or processor for the wireless device 13, in that it controls all operations of the wireless device 13 in accord with programming that it executes, for all normal operations, and for operations involved in the authentication and identification procedure under consideration here. In the example, the wireless device 13 includes flash type program memory 114, for storage of various "software" or "firmware" program routines and mobile configuration settings, such as mobile telephone number (MTN or MDN), etc. The wireless device 13 may also include a non-volatile random access memory (RAM) 116 for a working data processing memory. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13 includes a processor, and programming stored in the flash memory 114 configures the processor so that the mobile station is capable of performing various desired functions, including transferring and accepting control of a conference bridge.

As discussed above, functions relating to conference calls and transfer of control of the conference bridge may be implemented on one or more computers connected for data communication via the components of a packet data network, operating as the TAS 27 in coordination with the MRF 34 and/or on programmable mobile stations 13, in accordance with the methodology of either FIG. 2 or FIG. 3A/B. An exemplary mobile station device has been discussed above with respect to FIG. 4. Although special purpose devices may be used as the server(s), such devices also may be implemented using one or more hardware platforms intended to represent a general class of data processing device commonly used to run "server" programming so as to implement the functions discussed above, albeit with an appropriate network connection for data communication.

Figure 5:
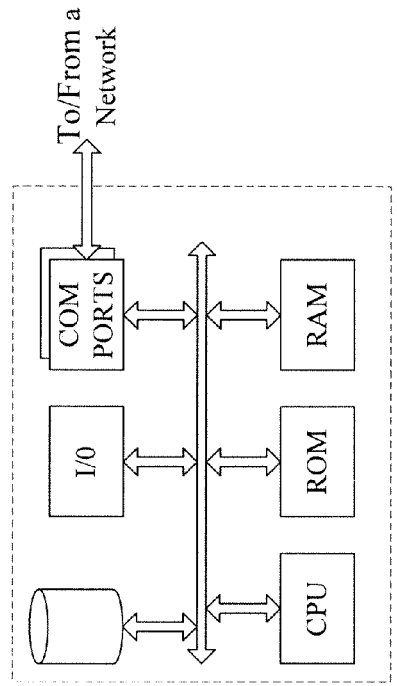
FIG. 5 is a simplified functional block diagram of a computer that may be configured as a host or server, for example, to function as the MRF for conference bridge maintenance and transfer in the system of FIG. 1.
Figure 6:
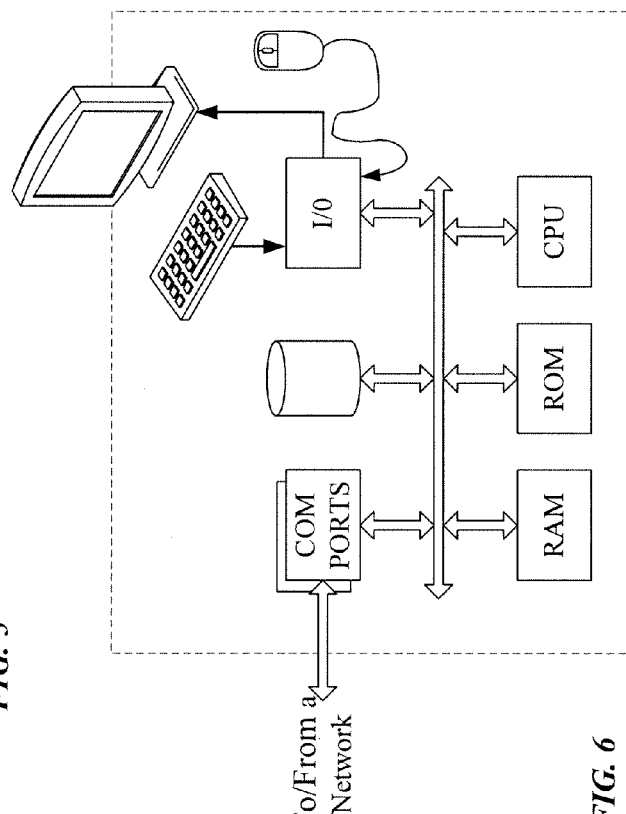
FIG. 6 is a simplified functional block diagram of a personal computer or other work station or terminal device, although that device may also be configured as a server.

FIGS. 5 and 6 provide functional block diagram illustrations of general purpose computer hardware platforms, as might be used as servers or other computers discussed in the examples above. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of creating, maintaining, and transferring a conference call, as outlined above, may be embodied in programming for a server and in the later example programming for a mobile station. Program aspects of the technology may be thought of as "products" or "articles of manufacture" typically in the form of executable code and/or associated data that is carried on or embodied in a type of machine readable medium. "Storage" type media include any or all of the tangible, non-transitory memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of the TAS 27 and/or into one or more IMS terminals. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible non-transitory storage medium, a carrier wave medium or a physical transmission medium. Non-volatile tangible non-transitory storage media include, for example, optical or magnetic disks, such as any of the storage devices in any of the mobile stations, various computers or the like, as shown in the drawings. Volatile tangible non-transitory storage media include dynamic memory, such as main memory of such a computer platform or mobile station. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of machine-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, EPROM and EEPROM, a Flash-EPROM, any other memory chip or cartridge, a carrier wave transporting data or instructions, cables or links transporting such a carrier wave, or any other medium from which a computer can read programming code and/or data. Many of these forms of computer or machine readable media may be involved in carrying one or more sequences of one or more instructions to a processor for execution.

The conference bridge maintenance and transfer technologies outlined above may be modified and/or enhanced in a variety of ways. For example, although two user equipments (UEs) or terminals are discussed, the principles above can easily be extended to a multi-party conference call scenario where two or more other parties and the call set-up procedure would bridge the parties together and provide the transfer of control of the conference bridge to any of the participants if their equipment is an IMS terminal.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, comprising steps of:
   providing control of a conference bridge to a first terminal by a Media Resource Function (MRF) controller during an ongoing conference call using the conference bridge;
   receiving by the MRF controller a request from the first terminal to transfer control of the conference bridge to a second terminal;
   upon receiving an acceptance of control of the conference bridge from the second terminal prior to the first terminal severing control of the conference bridge, transferring by the MRF controller control of the conference bridge to the second terminal; and
   continuing the ongoing conference call through the conference bridge until no terminal has control of the conference bridge, wherein each terminal is an IP Multimedia Core Network Subsystem (IMS) enabled terminal; and either of:
   generating, by the first terminal while in control of the conference bridge in the ongoing conference call, in response to a trigger an alert to a user of the first terminal to transfer control of the conference bridge; or
   automatically offering by the first terminal while having control of the conference bridge, an option to accept or reject control of the conference bridge to a preconfigured hierarchy of alternate terminals, in response to a trigger, and if a first of the alternate terminals rejects or does not accept within a predetermined time the control of the conference bridge, providing the option to accept or reject control of the conference bridge to an alternate terminal one level lower in hierarchy, one terminal at a time, until a terminal in the hierarchy accepts control of the conference bridge or no terminal has control of the conference bridge.

2. The method of claim 1, further comprising:
   upon the second terminal rejecting or not accepting control within a predetermined time, providing an option to the first terminal to transfer control of the conference bridge to an alternate terminal; and
   offering control of the conference bridge to the alternate terminal, wherein the acceptance is responsive to the offer of control of the conference bridge to the alternate terminal.

3. The method of claim 1, further comprising:
   upon the second terminal rejecting or not accepting control within a predetermined time, offering control of the conference bridge to an alternate terminal from a predetermined ordering of alternate terminals on the conference call, wherein the acceptance is responsive to the offer of control of the conference bridge to the alternate terminal.

4. The method of claim 1, further comprising the first terminal, while in control of the conference bridge, generating an alert to a user of the first terminal to transfer control of the conference bridge in response to a trigger.

5. The method of claim 4, further comprising monitoring a power level of the first terminal while in control of the conference bridge, by the first terminal, wherein the trigger relates to the power level falling to or below a threshold.

6. The method of claim 4, wherein the trigger is at least one of a scheduling conflict or an intervening event.

7. The method of claim 4, further comprising automatically invoking a user interface on the first terminal while having control of the conference bridge, to transfer the control of the conference bridge to another terminal, in response to the trigger, wherein the invoking is by the first terminal.

8. The method of claim 1, wherein the second terminal is associated with a same user as the first terminal.

9. The method of claim 1, wherein the second terminal is not associated with the same user as the first terminal.

10. The method of claim 1, further comprising:
    automatically offering by the first terminal while having control of the conference bridge, an option to accept or reject control of the conference bridge to a preconfigured hierarchy of alternate terminals, in response to a trigger; and
    if a first of the alternate terminals rejects or does not accept within a predetermined time the control of the conference bridge, providing the option to accept or reject control of the conference bridge to an alternate terminal one level lower in hierarchy, one terminal at a time, until a terminal in the hierarchy accepts control of the conference bridge or no terminal has control of the conference bridge.

11. The method of claim 10, wherein the hierarchy is based on an order of invitation to the ongoing conference call.

12. The method of claim 1, further comprising notifying remaining conference participants that control of the conference bridge has been transferred to the second terminal when the second terminal accepts control of the conference bridge.

13. A conference bridge maintenance and transfer system in an IP Multimedia Core Network Subsystem (IMS), comprising:
    a Media Resource Function (MRF) controller; and
    a Telephony Application Server (TAS) for configured to:
        receive, during a conference call, a request message from a transferor terminal to transfer control of a conference bridge to a transferee terminal;
        interpret a body of the request message from the transferor terminal to determine the transferee identification; and
        forward a modified message with the transferee identification to the MRF controller,
    wherein the MRF controller is configured to:
        interpret the modified message forwarded from the TAS;

in response to interpreting the message from the TAS, transfer the control of the conference bridge from the transferor terminal to the transferee terminal;

send an acknowledgement message to the TAS of the transfer of the control of the conference bridge; and send a notification to the transferee terminal indicating the successful transfer of the control of the conference bridge.

14. The system of claim 13 wherein the MRF controller is further configured to:

transfer control of the conference bridge to the transferee terminal when the transferee terminal accepts control of the conference bridge prior to the transferor terminal severing the conference bridge.

15. The system of claim 13 wherein the MRF controller is further configured to:

notify remaining conference participants that control of the conference bridge has been transferred to the transferee terminal when the transferee terminal accepts control of the conference bridge.

16. The system of claim 13, wherein the request message received by the MRF controller from the TAS is either a modified REFER message or a modified INVITE message.

17. A method of transferring control of a conference bridge using a session initiation protocol (SIP) REFER infrastructure, comprising steps of:

receiving a REFER request message from a transferor terminal at a Telephony application server (TAS) to transfer control of the conference bridge from the transferor terminal to a transferee terminal;

interpreting a body of the REFER request message from the transferor terminal to determine the transferee identification and forwarding a modified REFER message with the transferee identification to a Media Resource Function (MRF) Controller, wherein the interpreting of the body of the REFER request message and the forwarding of the modified REFER message to the MRF controller is performed by the TAS;

interpreting the modified REFER message from the TAS and sending an acknowledgment message to the TAS that the transferee terminal is to have control over the conference bridge, wherein the interpreting of the modified REFER message and sending an acknowledgment to the TAS is performed by the MRF controller;

sending an acknowledgment message to the transferor terminal by the TAS, indicating that transfer of the control of the conference bridge is successful; and sending a notification to the transferee terminal by the MRF controller, whereby indicating that transfer of the control of the conference bridge is successful.

18. The method of claim 17, wherein the sending of the notification to the transferee terminal by the MRF controller occurs before sending the acknowledgment message to the transferor terminal by the TAS.

19. The method of claim 17, wherein the sending of the notification by the MRF controller to the transferee terminal that transfer of the control of the conference bridge is successful occurs at a same time as sending the acknowledgment message by the TAS to the transferor terminal that transfer of the control of the conference bridge is successful.

20. The method of claim 17, further comprising:

repeating the method by going back to the step of receiving a REFER request message from the transferor terminal at the TAS to transfer control of the conference bridge.

21. A method of transferring control of a conference bridge using a session initiation protocol (SIP) INVITE infrastructure, comprising steps of;

receiving an INVITE request message from a transferor terminal at a Telephony application server (TAS) to transfer control of the conference bridge from the transferor terminal to a transferee terminal, wherein the INVITE message includes a history and diversion information in a header;

interpreting the history and the diversion information in the header of the INVITE request message from the transferor terminal to determine the transferee identification and forwarding a modified INVITE message with the transferee identification to a Media Resource Function (MRF) Controller, wherein the interpreting of the header of the INVITE request message and the forwarding of the modified INVITE message to the MRF controller is performed by the TAS;

interpreting the modified INVITE message from the TAS and sending an acknowledgment message to the TAS that the transferee terminal is to have control over the conference bridge, wherein the interpreting of the modified INVITE message and sending an acknowledgment to the TAS is performed by the MRF controller;

sending an acknowledgment message to the transferor terminal by the TAS, indicating that transfer of the control of the conference bridge is successful; and sending a notification to the transferee terminal by the MRF controller, indicating that transfer of the control of the conference bridge is successful.

22. The method of claim 21, wherein the sending of the notification to the transferee terminal by the MRF controller occurs before sending the acknowledgment message to the transferor terminal by the TAS.

23. The method of claim 21, wherein the sending of the notification by the MRF controller to the transferee terminal that transfer of the control of the conference bridge is successful occurs at the same time as sending the acknowledgment message by the TAS to the transferor terminal that transfer of the control of the conference bridge is successful.

24. The method of claim 21, further comprising:

repeating the method by going back to the step of receiving an INVITE request message from the transferor terminal at the TAS to transfer control of the conference bridge.

\* \* \* \* \*